(12) United States Patent
Thomas et al.

(10) Patent No.: US 7,275,763 B2
(45) Date of Patent: Oct. 2, 2007

(54) AIR BAG SYSTEM AND METHOD

(75) Inventors: Scott David Thomas, Novi, MI (US);
Christina Lindblom, Nossebro (SE);
Lennart Karlsson, Alingsas (SE);
Marcus Weber, Untertheres (DE)

(73) Assignees: General Motors Corporation, Detroit, MI (US); Autoliv ASP, Inc., Ogden, UT (US)

( * ) Notice: Subject to any disclaimer, the term of this patent is extended or adjusted under 35 U.S.C. 154(b) by 440 days.

(21) Appl. No.: 10/811,084

(22) Filed: Mar. 26, 2004

(65) Prior Publication Data
US 2005/0212273 A1  Sep. 29, 2005

(51) Int. Cl.
*B60R 21/16* (2006.01)

(52) U.S. Cl. ............ 280/743.2; 280/736; 280/742

(58) Field of Classification Search ............ 280/743.2, 280/732, 739, 735, 743.1, 736, 742
See application file for complete search history.

(56) References Cited

U.S. PATENT DOCUMENTS

| | | | |
|---|---|---|---|
| 6,390,501 B1 | 5/2002 | Greib et al. ............. | 280/743.2 |
| 6,422,597 B1 | 7/2002 | Pinsenschaum et al. .... | 280/735 |
| 6,454,300 B1 | 9/2002 | Dunkle et al. ............. | 280/742 |
| 6,511,094 B2 | 1/2003 | Thomas et al. .......... | 280/743.2 |
| 6,513,835 B2 | 2/2003 | Thomas ................... | 280/743.2 |
| 6,561,545 B2 | 5/2003 | Greib et al. ............. | 280/743.2 |
| 6,565,114 B1* | 5/2003 | Thomas ................... | 280/728.2 |
| 6,616,177 B2 | 9/2003 | Thomas et al. ............. | 280/729 |
| 6,648,371 B2* | 11/2003 | Vendely et al. ............. | 280/739 |
| 6,918,614 B2* | 7/2005 | Ryan ....................... | 280/743.2 |
| 2002/0036400 A1 | 3/2002 | Winters et al. | |
| 2002/0096871 A1 | 7/2002 | Pinsenschaum et al. | |
| 2002/0117840 A1 | 8/2002 | Dunkle et al. | |
| 2003/0020266 A1 | 1/2003 | Vendely et al. | |

FOREIGN PATENT DOCUMENTS

| | | |
|---|---|---|
| DE | 10210328 A1 | 10/2002 |
| EP | 1323594 A2 | 7/2003 |

* cited by examiner

*Primary Examiner*—Paul N. Dickson
*Assistant Examiner*—Drew J. Brown

(57) ABSTRACT

An air bag system includes an inflatable air bag and a housing formed with a vent. A tether release/vent-modifying mechanism is connected to the housing and has a plurality of walls and a movable member. The movable member has a cap portion and a rod portion extending longitudinally from the underside of the cap portion. A first broad portion extends from the cap portion forward of the underside of the cap portion and covers or uncovers a vent in the housing when the movable member is actuated to move between first and second positions to release tethers connected to the air bag.

20 Claims, 5 Drawing Sheets

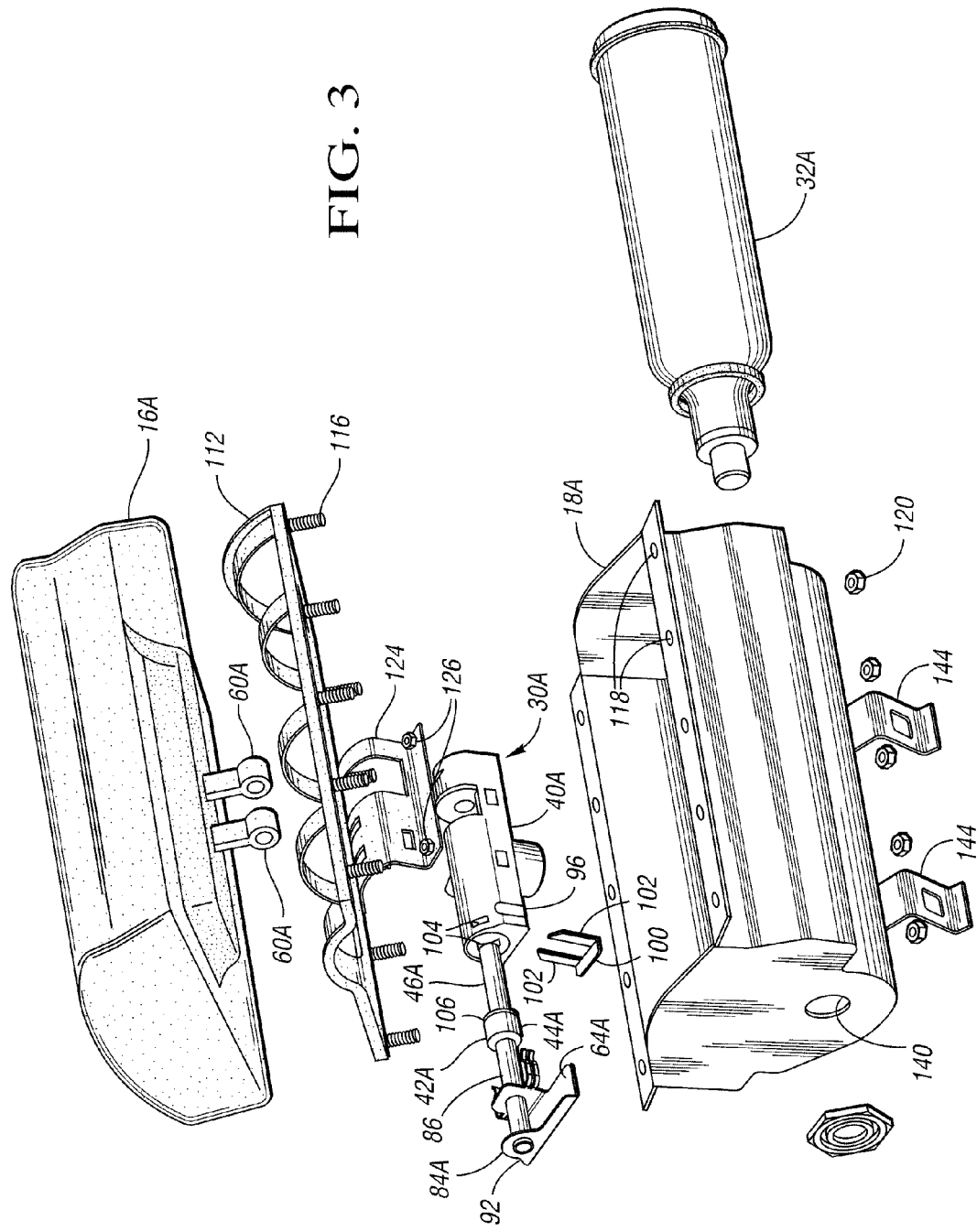

AIR BAG SYSTEM AND METHOD

TECHNICAL FIELD

The present invention relates to an automotive vehicle air bag system having a movable member actuatable upon deployment of an air bag for assisting in controlling the deployment of an air bag

BACKGROUND OF THE INVENTION

Air bag systems in automotive vehicles generally include an air bag that is designed to deploy toward a seat or seating location of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

The present invention is premised upon the employment in an air bag system of a tether release/vent-modifying mechanism having a movable member for (1) assisting in selectively retaining or releasing a tether element attached to an inflatable air bag to control the inflated profile thereof and at the same time (2) assisting in controlling the rate of inflation of the air bag. Both an air bag inflator and the tether release/vent-modifying mechanism are mounted to a module housing; however, the tether release/vent-modifying mechanism is not mounted to the inflator; the configuration of the mechanism is thus not restricted to that of any specific inflator, enabling wide usage of the mechanism with a variety of differently configured inflators. The tether release/vent-modifying mechanism employs a broad portion, also referred to herein as a louver, to cover or uncover one or more vent openings in the module housing, thus controlling the rate of venting of inflation gas released by the inflator from the housing and, accordingly, controlling the rate of air bag inflation and ride down speed (i.e., the rate of deflation of the airbag).

The movable member has both a cap portion and a rod portion extending longitudinally rearward of the cap portion. The broad portion includes a gas reaction surface that extends from the cap portion and reacts with (i.e., pushes against) inflator gas in the module housing when the movable member moves. The broad portion also includes a vent-covering portion. The tether elements are retained by the rod portion prior to movement of the movable member. The vent-covering portion is pushed and the rod portion is pulled by the cap portion when they act to cover (or uncover) the housing vent and release the tethers, respectively. The rod portion slides away from the tether elements, which are scraped off of the rod portion by abutting walls of the tether release/vent-modifying mechanism.

Accordingly, there is disclosed an air bag system with an inflatable airbag. Releasable tether elements are connected to the air bag. The air bag is inflatable upon release of gas from an inflator. A housing substantially surrounds the inflator and the air bag prior to inflation of the air bag. The housing is formed with a first vent for venting gas released by the inflator. A tether release/vent-modifying mechanism is operatively connected to the housing. The tether release/vent-modifying mechanism has a plurality of walls and a movable member. The movable member has a cap portion and a generally elongated rod portion extending longitudinally from the underside of the cap portion. A first broad portion extends from the cap portion forward of the underside thereof (i.e., the broad portion is connected to the cap portion at a location forward of the underside of the cap portion). The plurality of walls and the cap portion cooperate to partially form a pressurizable chamber. An actuator is operable to selectively emit gas into the presurrizable chamber for moving the movable member from a first position to a second position. The actuator further defines the pressurizable chamber. The tether elements are restrained by the rod portion when the movable member is in the first position, thereby restricting inflation of the air bag to a first profile. The tether elements are released from the rod portion when the movable member moves to the second position, thereby permitting inflation of the air bag to a second profile. The first broad portion covers the first vent in the housing when the movable member is in one of the first position or the second position and uncovers the first vent when the movable member is in the other of the first position and the second position.

In one aspect of the invention, the movable member includes an inflation gas reaction surface and a vent-covering portion. The inflation gas reaction surface pushes against the gas released from the inflator. In one embodiment, the vent-covering portion extends substantially rearward of the inflation gas reaction surface, in the same direction as the rod portion. The cap portion pushes the vent-covering portion and pulls the rod portion when the movable member moves from the first position to the second position.

In another aspect of the invention, the cap portion includes a deformably expandable forward end. When the forward end is deformed, it expands and thereby retains the broad portion to the cap portion such that the broad portion extends from the cap portion.

In yet another aspect of the invention, the tether release/vent-modifying mechanism is operatively connected to the housing at a first portion of the housing. The inflator is mounted to the housing at a second portion of the housing such that the tether release/vent-modifying mechanism and the inflator are not mounted to one another.

In still another aspect of the invention, an air bag retainer, also referred to herein as a cushion retainer, is mounted to the housing for retaining the air bag to the housing upon inflation of the air bag. The tether release/vent-modifying mechanism is mountable to the air bag retainer and is thereby operatively connected to the housing via the air bag retainer when the air bag retainer is mounted to the housing.

In another aspect of the invention, the tether release/vent-modifying mechanism includes a floor. The floor is matable with the plurality of walls. The floor is formed with an electrical connector opening. The electrical connector opening abuts the actuator when the floor and the plurality of walls are mated. The electrical connector opening is configured to receive an electrical connector connectable to the actuator. The floor is formed with a channel leading to the opening. The channel is adapted to receive wiring which may be routed to the electrical connector along the channel.

In yet another aspect of the invention, the floor portion includes an integral retention pin. The plurality of walls is formed with a pin opening sized to receive the retention pin. When the floor and the plurality of walls are mated, the integral retention pin extends towards the movable member from the floor portion to abut the movable member and thereby retain the movable member in the first position. The retention pin is sheared by the movable member when the movable member moves to the second position.

In still another aspect of the invention, the first broad portion is releasably retained by the plurality of walls when the movable member is in the first position and is released from the plurality of walls after emission of gas by the actuator to permit the movable member to move to the second position. For example, the tether release/vent-modifying mechanism may include spring-biased arms. The spring-biased arms extend from the first broad portion toward the plurality of walls and are biased to releaseably retain the first broad portion to the plurality of walls when the movable member is in the first position. The spring-biased arms flex to release the first broad portion from the plurality of walls after emission of gas by the actuator to permit the movable member to move to the second position. Alternatively, a releasably retainable engaging member formed on either the first broad portion or the plurality of walls that is releasably engageable at an engaging member opening formed in the other of the first broad portion and the plurality of walls may be used to retain the movable member in the first position and release after emission of gas by the actuator to permit the movable member to move to said second position. Similarly, a releasably retainable engaging member may be formed in either the floor or the first broad position and an engaging member opening sized to receive the engaging member may be formed in the other of the floor or the first broad portion.

In still another aspect of the invention, the air bag system includes a forked stopping element. The forked stopping element has tines. The plurality of walls is formed with tine openings sized to receive the tines. The tines stop movement of the movable member at the second position when the tines are received in the tine openings. The forked stopping element may be formed with a releasably retainable engaging member engageable at an engaging member opening formed in the first broad portion, as discussed above.

A vehicle having an air bag system for impact restraint includes a vehicle body. The vehicle body defines an interior space therein. The vehicle further includes an air bag system as described above. The air bag of the air bag system deploys into the interior space upon release of gas from the inflator.

A tether release/vent-modifying mechanism for an air bag system includes a plurality of walls and a movable member having a cap portion, a rod portion and a first broad portion extending from the cap portion, as described above.

A method of assembling on an air bag system is provided. The air bag system includes an inflatable air bag. Releasably restrainable tether elements are attached to the air bag. A tether release/vent-modifying mechanism releasably restrains the tether elements. The air bag is inflatable to a first profile when the tether elements are retrained and to a second profile when the tether elements are released. An air bag retainer retains the air bag to a module housing upon inflation. The method includes securing the tether release/vent-modifying mechanism to the air bag retainer. The method further includes connecting the air bag to the air bag retainer. The method further includes restraining the tether element at the movable member. The method includes, after the securing step, attaching the air bag retainer to the module housing such that the air bag is retained by the housing upon inflation of the air bag. The method further includes attaching the inflator to the module housing. The method may further include mounting the module housing to a vehicle.

The above objects, features and advantages and other objects, features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration in an exploded view of an air bag system such as that of FIG. 1;

DESCRIPTION OF THE PREFERRED EMBODIMENTS

The present invention relates to an improved air bag system and an automotive vehicle having the same. The invention is at least partially based upon improvements over U.S. Pat. No. 6,513,835 which is herein expressly incorporated by reference.

Figure 1:
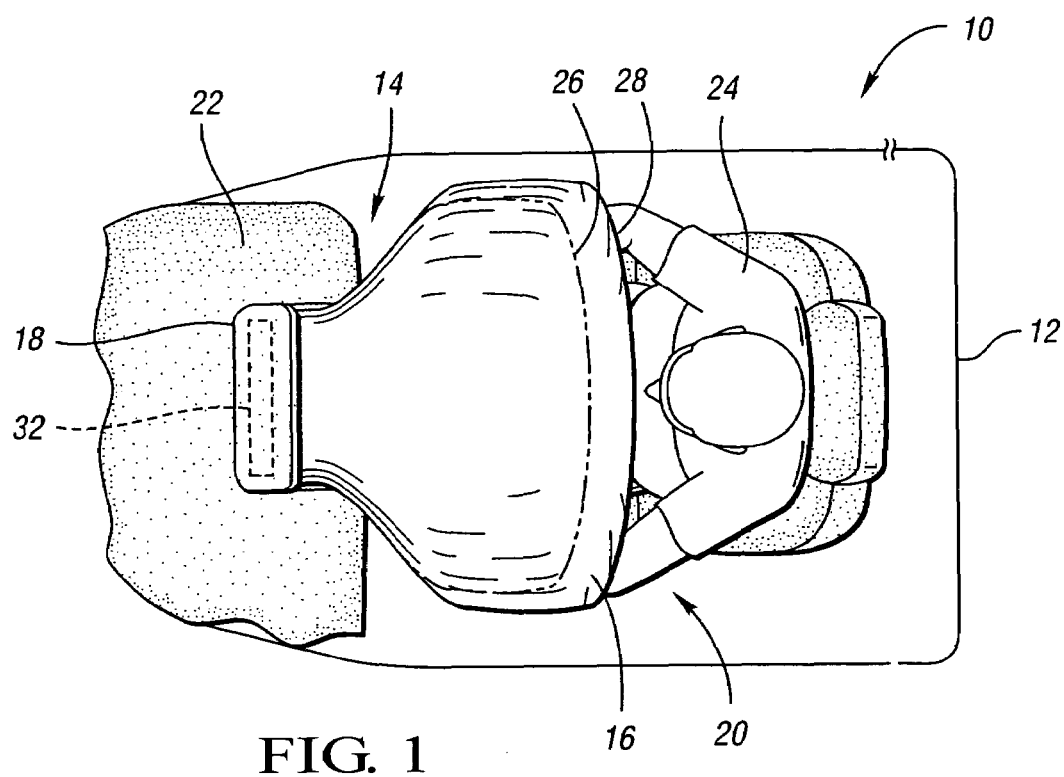
FIG. 1 is a schematic plan view illustration of an air bag system mounted to a vehicle.

Referring to the drawings, wherein like reference numbers refer to like components, FIG. 1 shows a vehicle 10 having a vehicle body 12. An air bag system 14 is mounted to the vehicle 10. The air bag system 14 includes an air bag 16 connected to an air bag module housing 18. An inflator 32 is mounted within the housing 18. The air bag module housing 18 is mounted within an instrument panel 22, although it may be mounted elsewhere on the vehicle 10 within the scope of the invention. The air bag 16 is selectively deployable in the interior space 20 toward an occupant 24 upon release of inflation gas by the inflator 32. The air bag 16 is inflatable when deployed either to a first profile 26 or to a second profile 28.

Figure 2A:
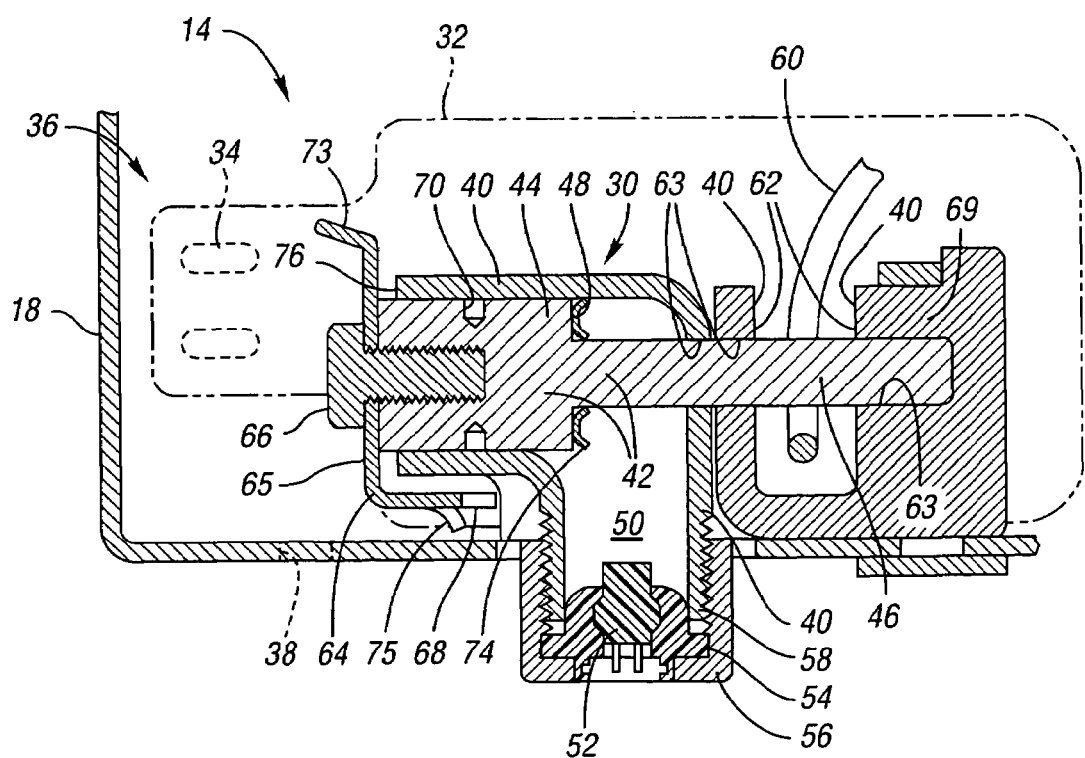
FIG. 2A is a schematic cross-sectional illustration of a tether release/vent-modifying mechanism used in an air bag system such as that of FIG. 1, in a nonactuated state.

Referring to FIG. 2A, the air bag system 14 includes a tether release/vent-modifying mechanism 30 which is mounted to the housing 18 such that it is substantially contained within the housing. The inflator 32 is also mounted within the housing 18. The tether release/vent-modifying mechanism 30 can be directly attached to the housing 18 of FIG. 2A with threaded fasteners or by a variety of other attachment means readily understandable to those skilled in the art. As may be better viewed in FIG. 2B, the inflator 32 rests substantially along side the tether release/vent-modifying mechanism 30 within the housing 18. Referring again to FIG. 1, as will be readily understood by those skilled in the art, sensors mounted to the vehicle may be connected in signaling communication with the inflator 32, and under certain sensed conditions, signal the inflator 32 to release gas from inflator ports 34 into a housing interior space 36. As shown in FIG. 1, an air bag 16 is connected to the housing 18 and inflates upon release of gas from the inflator 32. Referring again to FIG. 2A, the housing 18 is formed with a housing vent 38 (also referred to herein as a first vent) which enables gas released from the inflator 32 to pass from the housing interior space 36 to surrounding atmosphere, thus affecting the inflation and ride-down (i.e., deflation) of the air bag 16 of FIG. 1.

The tether release/vent-modifying mechanism 30 includes a plurality of walls 40. The tether release/vent-modifying mechanism 30 also includes a movable member 42. The movable member 42 includes a cap portion 44 and a generally elongated rod portion 46 extending longitudinally from an underside 48 of the cap portion. The cap portion 44 is slideable within the plurality of walls 40; the cap portion 44 and the plurality of walls 40 cooperate to at least partially close off and form a pressurizable chamber 50.

An actuator 52 is held within an actuator carrier 54. The actuator 52 and actuator carrier 54 are connected to the plurality of walls 40 to further define the pressurizable chamber 50. The actuator 52 and actuator carrier 54 may be contained within a threaded cap 56 which connects to threaded ends 58 of the walls 40 to hold the actuator and actuator carrier 52, 54 to the plurality of walls 40. Alternatively, the actuator and actuator carrier 52, 54 may be connected to the walls 40 by a threaded plug (not shown) or the actuator 52 may be crimped to the walls 40 with or without the usage of an actuator carrier 54.

A tether element 60 is looped around the rod portion 46 of the movable member 42 such that it is retained by the rod portion 46 in a gapped space 62 formed by the walls 40. The tether element 60 is connected to an air bag (such as the air bag 16 of FIG. 1) at an end opposite from the loop (not shown in FIG. 2A). Placement of the rod portion 46 through openings 63 formed in the walls 40 holds the tether element 60 within the gapped space 62.

A first broad portion 64 extends from the cap portion 44. The first broad portion 64 is connected to the cap portion 44 forward of the underside 48 of the cap portion. The first broad portion 64 may be secured to the cap portion 44 by a variety of different mechanisms, including a threaded screw 66 as shown in FIG. 2A. Additionally, the broad portion 64 may be welded to the cap portion 44 or may be integrally formed therewith. The first broad portion 64 includes a gas reaction surface 65 and a vent-blocking portion 68. The vent blocking portion 68 extends from the gas reaction interface 65 such that it is arranged substantially perpendicular to the gas reaction surface 65.

In FIG. 2A, the movable member 42 is shown in a first position wherein the first broad portion 64 is not covering the vent 38. In this first position, the tether element 60 is retained by the rod portion 46. Upon other sensed conditions (which may be different than the sensed conditions triggering release of gas from the inflator), the actuator 52 actuates by releasing gas into the pressurizable chamber 50. The conditions causing the actuator 52 to actuate may include impact speed, weight of the occupant, sensed seat or occupant position, etc. Each of these conditions may be determined with sensors in signaling communication with the actuator. The pressure in the chamber 50 moves the movable member 42 from the first position of FIG. 2A to a second position depicted in FIG. 2B, wherein the broad portion 64 (more specifically, the vent-blocking portion 68 thereof) covers the vent 38. Additionally, in the second position, the rod portion 46 moves out of the gapped space 62 thereby releasing the tether element 60. The walls 40 at the gapped space 62 act to scrape the tether element 60 off of the rod portion 46 as the rod portion travels forward through the wall openings 63. A rearward portion 69 of the walls 40 prevents rearward movement of the movable members 42 when the movable member 42 is in the first, nonactuated position.

The movable member 42 may be formed with an annular recess 70 which is adapted to receive a stay 72 (shown fractured into two pieces in FIG. 2B) which extends from the walls 40 into the annular recess 70. The stay 72 functions as a retention feature, to hold the movable member 42 in the first position prior to actuation of the actuator 52. The stay 72 is purposely formed of a weakened strength such that, upon actuation of the actuator 52, the pressure in the pressurizable chamber 50 will overcome the stay 72, thereby fracturing the stay 72 (see FIG. 2B), allowing the movable member 42 to move to the second position of FIG. 2B. Other retention features that may be employed include a retention pin (not shown) extending from the housing walls into the cap portion 44 adjacent to a weakened wall (not shown) of the cap portion 44. Actuation of the actuator 52 causes the pin to break the weakened wall, allowing the movable member 42 to move to the actuated position. (For alternative retention features, see also discussion infra regarding retention pin 152 of FIG. 5A, the spring-biased arms 94 of FIG. 4, as well as the engaging members 178, 178A and 178B of FIGS. 6A-6C.) Alternative retention features are also discussed in U.S. Pat. No. 6,513,835 at column 6, lines 1-40 (referred to as pre-actuation stays).

The tether release/vent-modifying mechanism 30 may include a slow down feature that acts to slow movement of the movable member as it approaches the second position. For example, a forward-jutting portion 73 of the broad portion 64 may flexibly deform (by flexing upward or buckling) upon contact with the module housing 18 (which acts as a stopper) when the movable member 42 approaches the second position (shown in FIG. 2B, thus absorbing energy and slowing movement. The forward-jutting portion could be located elsewhere along the first broad portion 64. Alternatively, a forward-jutting element may extend from the threaded screw 66. A deformable, rearward-jutting element may extend from the housing 18 toward the broad portion 64 to deform upon contact with the broad portion 64, thereby slowing movement of the movable member 42 prior to the housing 18. Such a rearward-jutting element may engage with an opening formed in the broad portion, thereby "locking" with the broad portion and serving to prevent reverse travel of the movable member 42. In fact, both a forward jutting element on the broad portion and a rearward-jutting element on the housing 18 may be used together and, if placed in alignment with one another, may engage with one another to prevent reverse travel (i.e., also act as an anti-bounce back feature). Alternatively or in addition, the walls 40 may be formed with one or more actuation vent holes (not shown) that act as a slow down feature. The actuation vent hole may be covered by the cap portion in the first position and uncovered when the cap portion moves out of the first position, thus permitting venting of actuator gas, and thereby release the gas pressure pushing the movable member 42.

Figure 2B:
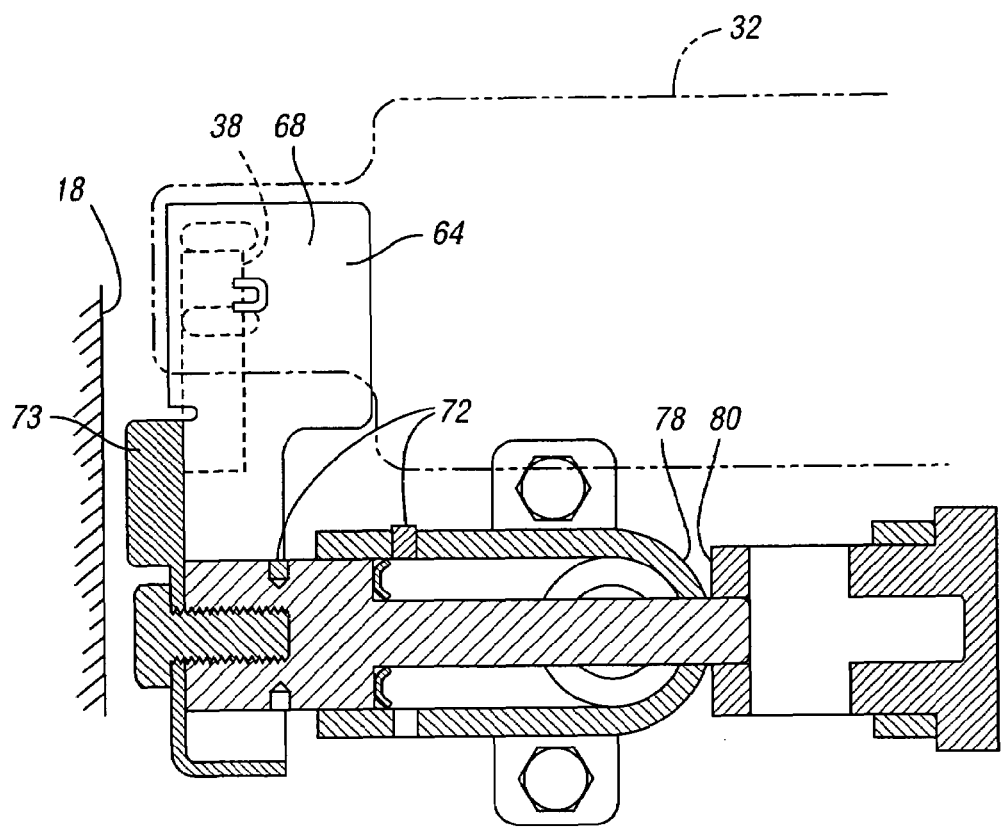
FIG. 2B is a schematic cross-sectional illustration of the tether release/vent-modifying mechanism of FIG. 2A, in an actuated state.

The movable member 42 may also be formed with other anti-bounce back features such as a spring-biased washer seal 74 mounted to the underside 48 of the cap portion 44. The washer seal 74 is biased toward the cap portion 44 and thus expands to fill the space between the wall 40 and the rod portion 46, thereby resisting backward movement of the movable member 42 after it moves to the actuated position of FIG. 2B. The biased nature of the washer seal allows it to seal the pressurizable chamber 50. Additionally, a tab 75 may be formed in the broad portion 64 such that, upon movement of the movable member 42 from the first position to the second position the tab 75 catches on the housing 18 at the vent 38, as shown in FIG. 2B. Each of these anti-bounce back features function to retain the movable member 42 at the second position after actuation of the actuator 52, preventing the movable member 42 from moving back toward the non-actuated position of FIG. 2A. A variety of mechanisms may act as stoppers to stop movement of the movable member 42. For instance, the forward end 76 of the walls 40 may taper or curve radially inward (not shown), acting as a wedge to stop forward movement of the movable member 42. A separate cap having such a taper or curve may be fitted on the forward end 76 of the walls 40 to serve as such a wedge. Additionally, see the discussion infra of the forked stopping element 100 with respect to FIG. 3.

Notably, the vent-blocking portion 68 extends rearward from the gas reaction surface 65, toward the rod portion 46. Accordingly, the venting covering portion 68 is pushed by the cap portion 44 when the movable member 42 moves from the non-actuated position of FIG. 2A to the actuated position of FIG. 2B. The bulk of the resistance from the inflation gas during mechanism travel is thus borne by the gas reaction surface 65.

If inflation gas is released from the inflator 32 and the actuator 52 is not actuated, the tether element 60 will restrain the air bag to the first profile 26 shown in FIG. 1. Alternatively, if the actuator 52 is actuated in conjunction with release of inflator gas of the inflator 32, then the movement of the movable member 42 will release the tether element 60, allowing the air bag 16 of FIG. 1 to achieve the second profile 28. Notably, the rod portion 46 is pulled by the cap portion 44 as the movable member 42 moves from the non-actuated position of FIG. 2A to the actuated position of FIG. 2B.

Within the scope of the invention, a first wall 78 and second abutting wall 80 of the walls 40 (as shown in FIG. 2B) may be moved apart from one another (not shown) to accommodate lengthening rod portion 46 such that it includes an exposed portion (not shown) between the parted first and second walls 78, 80. A second broad portion (not shown) may be connected to extend from the exposed portion of the rod portion such that the second rod portion is movable with the movable member to cover and uncover a second vent (not shown) in the housing 18 when the movable member 42 moves from the first position of FIG. 2A to the second position of FIG. 2B. The second vent would be located further from the inflator ports 34, and thus be a low-pressure vent in comparison with the first vent 38 which is disposed close to the inflator parts 34 and is therefore a high-pressure vent. Both of the first and second vents may be covered in the first position and uncovered in the second position or vice versa. Alternatively, one may be covered in the first position and uncovered in the second position while the other is uncovered in the first position and covered in the second position. Additionally, the first broad portion may be configured to cover and uncover two or more first vents. Opposing second broad portions may extend from the rod portion to cover and uncover two or more second vents. Accordingly, a wide variation in ride-down venting is possible.

Figure 4:
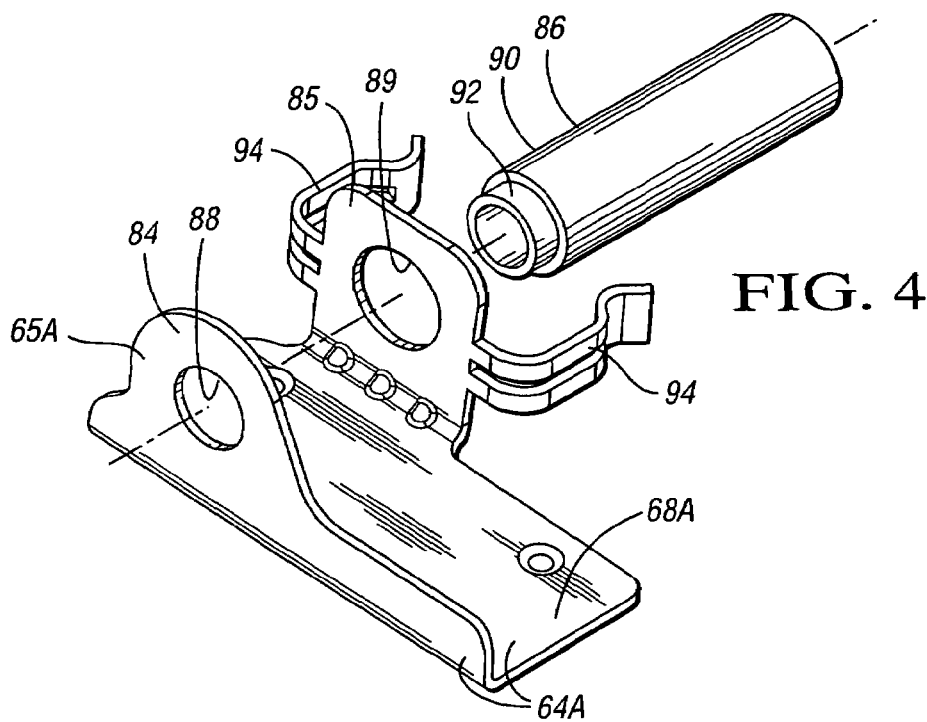
FIG. 4 is a schematic illustration in perspective view of a broad portion and in fragmentary perspective view of a forward extension of a cap portion of a movable member used in a tether release/vent-modifying mechanism.

Referring to FIG. 3, an alternative embodiment of a movable member 42A wherein a cap portion 44A includes a forward extension 86 is depicted. A first broad portion 64A extends from the forward extension 86. Referring to FIG. 4, a vent blocking portion 68A extends substantially rearward of a gas reaction surface 65A formed on a first flange portion 84 of the broad portion 64A. The first flange portion 84 and a second flange portion 85 are formed with openings 88, 89, respectively. The opening 89 is sized to permit an outer diameter 90 of the forward extension 86 therethrough. The opening 88 is of a smaller diameter, permitting only a forward end 92 of the forward extension 86 therethrough. The forward end 92 is designed to be deformably expandable. Accordingly, after slipping, the forward extension 86 through the openings 88, 89, the forward end 92 is deformed, thereby expanding and holding the broad portion 64 to the forward extension 86 as shown in FIG. 3.

Referring again to FIG. 4, spring-biased arms 94 extend from either side of the second flange portion 85. Referring again to FIG. 3, the spring-biased arms 94 are sized to fit around outer curved protrusions 96 formed in the plurality of walls 40A. Accordingly, the spring-biased arms 94 hold the movable member 42A to the plurality of walls 40A when the movable member 42A is in a non-actuated position. Like the stay 72 of FIG. 2B, the spring-biased arms 94 are biased with a tension that is overcome by the pressure built up in the pressurizable chamber of the tether release/vent-modifying mechanism 30A upon actuation of the actuator. Accordingly, the spring-biased arms flex to release the movable member 42A from the protrusions 96 of the plurality of walls 40A upon actuation of the actuator, thus permitting movement of the movable member 42A to an actuated position.

Referring to FIG. 3, a forked stopping element 100 having spaced tines 102 is depicted. The walls 40A are formed with tine openings 104 sized to receive the tines 102. The tines 102 are spaced apart such that the forward extension 86 of the cap portion 44A is movable between the tines 102. However, a larger rearward end 106 of the cap portion 42A (from which the rod portion 46A extends) is of too large a diameter to fit between the tines 102. Accordingly, when the movable member 42A and the forked stopping element 100 are placed in their respective positions within the plurality of walls 40A, the forked stopping element 100 acts to stop the movable member 42A at an actuated, second position (corresponding to the actuated position shown in FIG. 2B) when the movable member 42A moves upon actuation. The forked stopping element 100 (which may also be referred to as a stop clip) may be deformable such that it is deformed (e.g., bent or buckled) by the movable member 42A. Additionally, the rearward end 106 of the cap portion may be beveled such that it wedges into the stopping element 100, thereby causing the stopping element 100 to also act as an anti-bounce back feature.

A cushion retainer 112 is used to retain an air bag 16A to the module housing 18A upon deployment of the air bag. The cushions retainer 112 fastens to the module housing 18A with fastening elements 116 which are received within fastening openings 118 of the module housing 18A and then fastened thereto with retaining studs 120. The air bag 16A is formed with a plurality of openings (not shown) spaced to conform to the spacing of the fastening elements 116. Accordingly, the air bag openings may be slipped over the fastening elements 116 and held between the cushion retainer 112 and the module housing 18A when the cushion retainer 112 is fastened thereto. A variety of other mechanisms for fastening the air bag 16A to the cushion retainer and the cushion retainer to the housing may also be employed.

Notably, the cushion retainer 112 includes a tether release/vent-modifying mechanism connector portion 124. The tether release/vent-modifying mechanism 30A may be secured to the tether release/vent-modifying mechanism connector portion 124 via fasteners (not shown) that fit through connector portion openings 126 to secure flange elements (not shown) extending from the walls 40A to the connector portion 124. Other means for attaching the mechanism 30A into the connector portion 124 are also readily understandable to those skilled in the art. For instance, snap-fit tabs may extend from the mechanism 30A that are snappable into like-sized openings formed in the connector portion 124. Welding and bonding are also feasible.

Importantly, the tether release/vent-modifying mechanism 30A may be secured to the tether release/vent-modifying mechanism connection portion 124 prior to connecting the cushion retainer 112 to the module housing 18A. The inflator 32A may be mounted to the housing 18A at inflator opening 140 prior to or after connecting the preassembled tether release/vent-modifying mechanism 30A, cushion retainer 112, and air bag 16A to the module housing 18A. The module housing 18A then mounts to a vehicle via mounting elements 144 and, optionally, fasteners 116. This ability to preassemble the tether release/vent-modifying mechanism 30A and cushion retainer 112 helps to ensure a proper securement of tether elements 60A (one shown) to the tether release/vent modifying mechanism 30A, as the securement may be performed outside of the constraints of the module housing 18A.

Figure 5A:
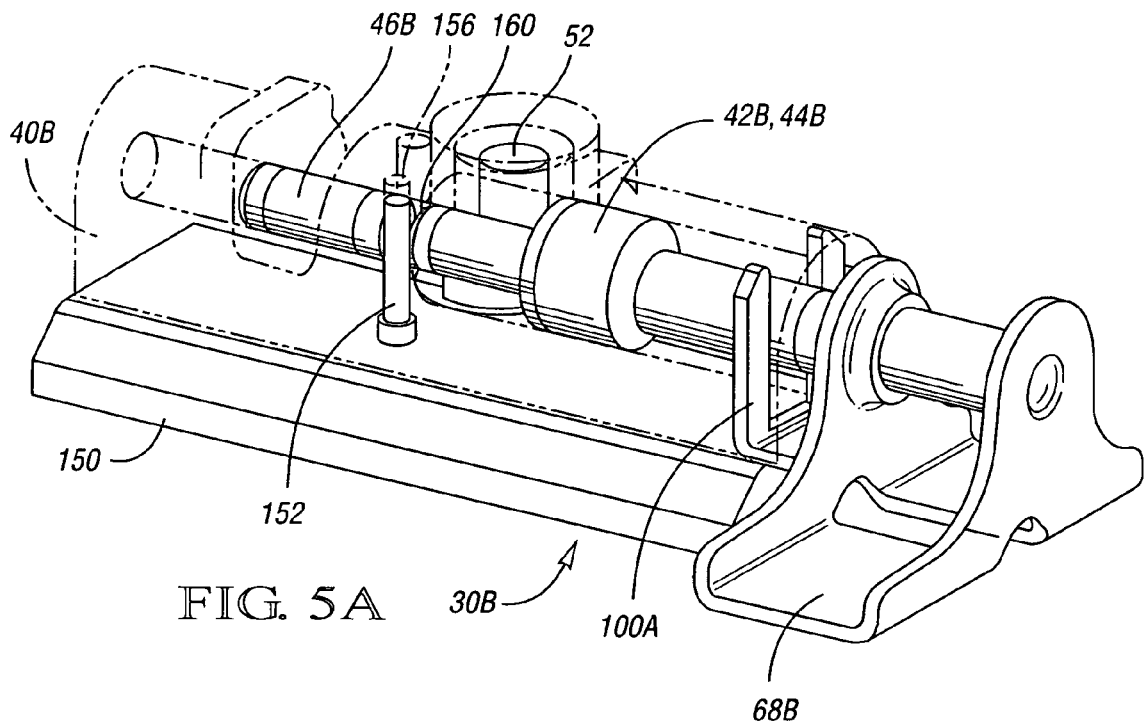
FIG. 5A is a schematic illustration in perspective view of a tether release/vent-modifying mechanism having a floor mated to the walls of the tether release/vent-modifying mechanism, wherein the floor includes an integral retention pin.
Figure 5B:
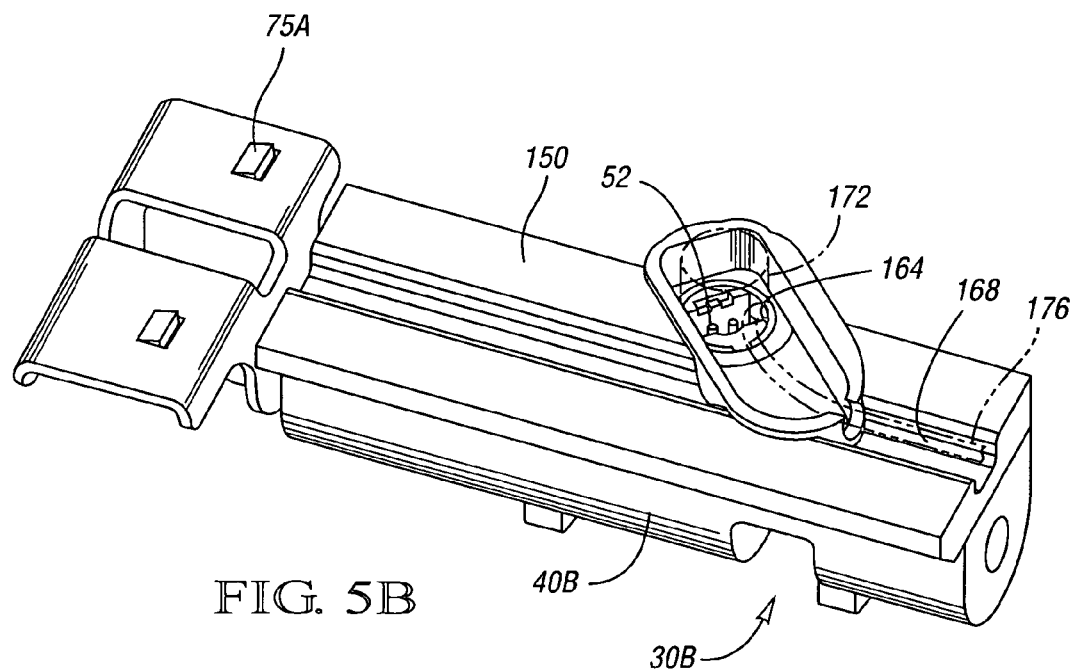
FIG. 5B is a schematic illustration in perspective view of the floor of FIG. 5A including an opening sized to receive an electrical connector connectable with an actuator of the tether release/vent-modifying mechanism.

Referring to FIGS. 5A and 5B, another embodiment of a tether release/vent-modifying mechanism 30B is depicted. Referring to FIG. 5A, a tether release/vent-modifying mechanism 30B includes a floor 150 that is matable with the plurality of walls 40B. The floor 150 is formed with an integral retention pin 152. The plurality of walls 40B are formed with a pin opening 156 sized to receive the retention pin 152. The floor 150 is matable with the plurality of walls 40B, and, when so mated, the retention pin 152 extends from the floor 150 through the pin opening 156 to abut the rod portion 46B of the movable member 42B. The rod portion 46B is formed with an annular recess 160. The retention pin 152 abuts the rod portion 46B at the annular recess 160. Accordingly, the retention pin 152 retains the movable member 42B in the first position (i.e., the non-actuated position) prior to actuation of the actuator 52. The retention pin 152 is purposefully constructed of a low enough strength such that it will be sheared by the movable member 42B when the movable member moves to the second position (i.e., the actuated position) upon actuation of the actuator 52. A stop clip 100A may be employed to stop the movable member 42B by contacting the cap portion 44B when the movable member 42B moves to the actuated position.

Referring to FIG. 5B, tabs 75A are formed in the broad portion 68B to catch on vent 38 of FIG. 2, acting as an anti-bounce back feature, as discussed above. Additionally, the floor portion 150 is formed with an electrical connector opening 164. The electrical connector opening 164 abuts the actuator 52 when the plurality of walls 40B and the floor portion 150 are mated. The floor portion 150 is also formed with a channel 168 leading to the electrical connector opening 164. An electrical connector 172 shown in phantom may be connected to the actuator 52 at the opening 164. Wiring 176 leading to the electrical connector 172 may be routed to the electrical connector 172 along the channel 168. The configuration of the tether release/vent-modifying mechanism 30B allows the actuator 52 to be crimped into the plurality of walls 40B prior to connecting the floor portion 150 to the plurality of walls 40B. Additionally, by integrating the retention pin 152 and the floor 150, a reduction in the number of separately assembled parts is accomplished.

Figure 6A:
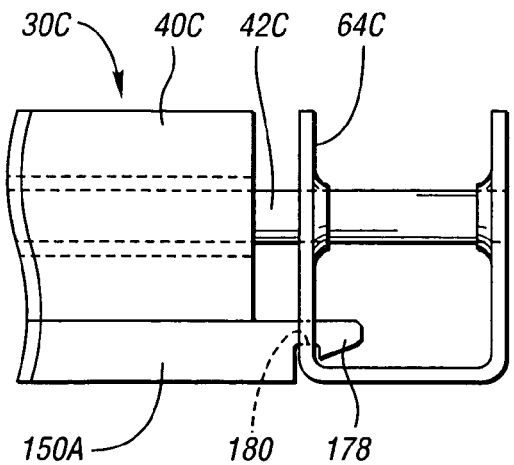
FIG. 6A is a fragmentary schematic illustration in side view of a tether release/vent-modifying mechanism having an engaging member for releasably retaining a broad portion.

In addition to the spring-biased arms 94 of FIG. 4, additional mechanisms for releasably restraining the first broad portion to the plurality of walls when the movable member is in the first position are contemplated. Referring to FIG. 6A, a tether release/vent-modifying mechanism 30C has a floor 150A that is formed with an engaging member 178 (which may also be referred to as a releasable tab). A first broad portion 64C is formed with an engaging member opening 180 (which may also be referred to as a tab opening). The engaging member opening 180 is sized to receive the engaging member 178 such that the first broad portion 64C is restrained by the floor portion 150A when the movable member 42C is in the first position. The engaging member 178 is releaseably engaged at the engaging member opening 180 when the movable member 42C is in this first position. Upon emission of gas by the actuator (not shown), pressure buildup of the gas overcomes the engagement of the engaging member 178 and the engaging member opening 180, causing the engaging member 178 to be released, allowing the movable member 42C to move to a second, actuated position. In an embodiment of a tether release/vent-modifying mechanism 30 not having a floor such as floor 150A, an engaging member similar to engaging member 178 may extend from the plurality of walls 40C to be releaseably engaged with an engaging member opening in a first broad portion.

Figure 6B:
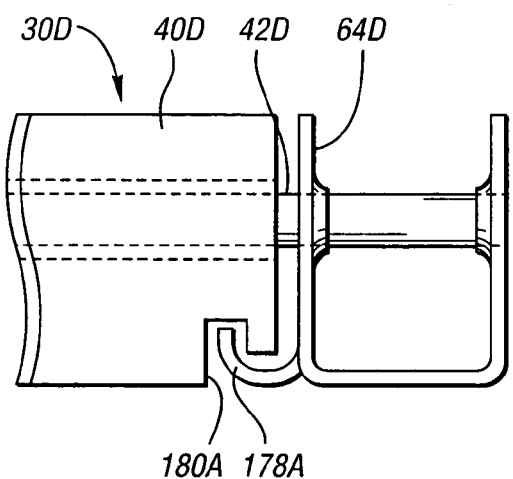
FIG. 6B is a fragmentary schematic illustration in side view of a tether release/vent-modifying mechanism and of a broad portion having an engaging member for releasably retaining the broad portion.

Referring to FIG. 6B, a first broad portion 64D is formed with an engaging member 178A that is releaseably engageable with an engaging member opening 180A formed in a plurality of walls 40D of a tether release/vent-modifying mechanism 30D. Like the engaging member 178 of FIG. 6A, the engaging member 178A releases from the opening 180A upon emission of gas by the actuator (not shown), thereby allowing movable member 420 to move to a second position (not shown). For an embodiment of a tether release/vent-modifying mechanism that includes a floor, an engaging member opening may be formed in the floor rather than in the plurality of walls to interact an engaging member extending from a first broad portion.

Figure 6C:
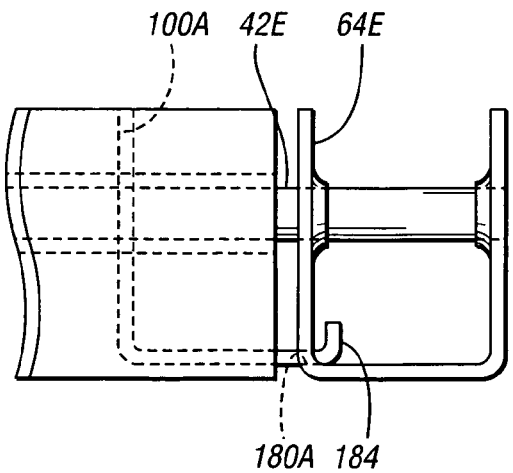
FIG. 6C is a fragmentary schematic illustration in side view of a tether release/vent-modifying mechanism with a forked stopping element that has an engaging member for releasably retaining a broad portion.

Referring to FIG. 6C, a forked stopping element 100A may be formed with a releasable engaging member, i.e., an extension tab 178B which extends forward toward a first broad portion 68E. The first broad portion 64E is formed with an engaging member opening 180B sized to receive and releaseably engage with the extension tab 178B. Like the engaging member 178 of FIG. 6A, the extension tab 184 releases from the an engaging member opening 180A upon emission of gas by the actuator (not shown), thereby allowing movable member 42E to move to a second position (not shown).

Referring again to FIG. 3, a method of assembling an air bag system (such as air bag system 14 of FIG. 1) includes securing a tether release/vent-modifying mechanism such as tether release/vent-modifying mechanism 30A to a cushion retainer such as cushion retainer 112. The method further includes connecting an air bag (not shown) to the cushion retainer. The method further includes restraining tether elements 60A at the rod portion 46A of the movable member 42A. The method further includes, after securing the tether release/vent-modifying mechanism 40A to the cushion retainer 112, attaching the cushion retainer 112 to the module housing 18A such that the air bag 16A is retained by the housing 18A upon inflation of the air bag 16A. The method further includes attaching the inflator 32A to the module housing 18A. This may be accomplished at any point during the assembly. The method may further include mounting the module housing 18A to a vehicle.

While the best modes for carrying out the invention have been described in detail, those familiar with the art to which this invention relates will recognize various alternative designs and embodiments for practicing the invention within the scope of the appended claims.

The invention claimed is:

1. An air bag system comprising:
   an inflator operable to release gas;
   an inflatable air bag having releasable tether elements connected thereto, wherein said air bag is inflatable upon release of gas from said inflator;
   a housing substantially surrounding said inflator and said air bag prior to inflation thereof, wherein the housing is formed with a first vent therein for venting gas released by said inflator;
   a tether release/vent-modifying mechanism operatively connected to said housing, wherein said tether release/vent-modifying mechanism has a plurality of walls and a movable member, wherein the movable member has a cap portion and a generally elongated rod portion extending longitudinally from an underside of said cap portion, wherein a first broad portion extends from said cap portion opposite said rod portion, wherein said plurality of walls and said cap portion cooperate to partially form a pressurizable chamber;
   wherein said tether release/vent-modifying mechanism further includes an actuator operable to selectively emit gas into said pressurizable chamber for moving said movable member from a first position to a second position, said actuator further defining said pressurizable chamber;
   wherein said tether elements are restrained by said rod portion when said movable member is in the first position, thereby restricting inflation of said air bag by said inflator to a first profile, wherein said tether elements are released from said rod portion when said movable member moves to said second position, thereby permitting inflation of said air bag by said inflator to a second profile;
   wherein said first broad portion covers said vent when said movable member is in one of said first position and said second position, and wherein said first broad portion uncovers said vent when said movable member is in the other of said first position and said second position.

2. The air bag system of claim 1, wherein said first broad portion includes an inflation gas reaction surface and a vent-covering portion, wherein said inflation gas reaction surface pushes against said gas released from said inflator, and wherein said cap portion pushes said vent-covering portion and pulls said rod portion when said movable member moves from said first position to said second position.

3. The air bag system of claim 1, wherein said cap portion includes a deformably expandable forward end, wherein said broad portion is retainably connectable to said cap portion to extend therefrom by deformably expanding said expandable forward end.

4. The air bag system of claim 1, wherein said tether release/vent-modifying mechanism is operatively connected to said housing at a first portion of said housing and said inflator mounts to said housing at a second portion of said housing such that said tether release/vent-modifying mechanism and said inflator are not mounted to one another.

5. The air bag system of claim 1, further comprising:
   an air bag retainer mountable to said housing for retaining said air bag to said housing upon inflation of said air bag, wherein said tether release/vent-modifying mechanism is mountable to said air bag retainer and is thereby operatively connected to said housing via said air bag retainer when said air bag retainer is mounted to said housing.

6. The air bag system of claim 1, wherein said tether release/vent-modifying mechanism further includes a floor, wherein said floor is matable with said plurality of walls, wherein said floor is formed with an electrical connector opening, wherein said electrical connector opening abuts said actuator when said floor and said plurality of walls are mated, wherein said electrical connector opening is configured to receive an electrical connector connectable to said actuator, wherein said floor is further formed with a channel leading to said electrical connector opening, wherein said channel is adapted to receive wiring, and wherein said wiring may be routed to said electrical connector along said channel.

7. The air bag system of claim 1, wherein said tether release/vent-modifying mechanism further includes a floor, wherein said floor is matable with said plurality of walls, wherein said floor further includes an integral retention pin wherein said plurality of walls is formed with a pin opening sized to release said retention pin, wherein when said floor and said plurality of walls are mated, said integral retention pin extends from said floor through said pin opening towards said movable member to abut said movable member and thereby retain said movable member in said first position prior to emission of gas by said actuator, and wherein said retention pin is sheared by said movable member when said movable member moves to said second position.

8. The air bag system of claim 1, wherein said tether release/vent-modifying mechanism further includes a floor, wherein said floor is matable with said plurality of walls, wherein one of said floor and said first broad portion is formed with a releasably retainable engaging member, wherein the other of said floor and said first broad portion forms an engaging opening sized to receive said engaging member, wherein said engaging member is retained at said engaging member opening when said movable member in said first position, and released after emission of gas by said actuator to permit said movable member to move to said second position.

9. The air bag system of claim 1, wherein said first broad portion is releaseably retained by said plurality of walls when the movable member is in said first position and released from said plurality of walls to permit said movable member to move to said second position after emission of gas by said actuator.

10. The air bag system of claim 9, wherein said first broad portion further includes spring-biased arms, wherein said spring-biased arms extend from said first broad portion toward said plurality of walls and are biased to so releasably retain said first broad portion at said plurality of walls when the movable member is in said first position, and wherein said spring-biased arms flex such that said first broad portion is so released from said plurality of walls after emission of gas by said actuator to permit said movable member to move to said second position.

11. The air bag system of claim 9, wherein one of said first broad portions and said plurality of walls is formed with a releasably retainable engaging member and the other of said first broad portion and said plurality of walls forms an engaging member opening sized to receive and releasably engage with said engaging member such that the engaging member is engaged at said engaging member opening, said first broad portion thereby being releasably retained at said plurality of walls when the movable member is in said first position, and wherein the engaging member is released after said emission of gas by said actuator, thereby permitting said movable member to move to said second position.

12. The air bag system of claim 1, further comprising a forked stopping element having tines, wherein said plurality of walls form tine openings sized to receive said tines, wherein said tines are operable to stop movement of said movable member at said second position when said tines are so received.

13. The air bag system of claim 12, wherein said forked stopping element includes a releasably retainable engaging member, wherein said first broad portion includes an engaging member opening sized to releasably engage said engaging member, wherein said engaging member is engaged at said engaging member opening when said movable member is in said first position, and said engaging member is released after said emission of gas by said actuator, thereby permitting said movable member to move to said second position.

14. A vehicle having an air bag system for impact restraint, comprising:
  a vehicle body at least partially defining an interior space therein;
  an air bag system comprising an inflatable air bag having releasable tether elements connected thereto, wherein said air bag is inflatable upon release of gas from an inflator to deploy into said interior space;
  said passenger air bag system further comprising a housing substantially surrounding said inflator and said air bag prior to inflation thereof, wherein the housing is formed with a first vent therein for venting gas released by said inflator;
  said passenger air bag system comprising a tether release/vent-modifying mechanism operatively connected to said housing, wherein said tether release/vent-modifying mechanism has a plurality of walls and a movable member, wherein the movable member has a cap portion and a rod portion extending from an underside of said cap portion, wherein a first broad portion extends from said cap portion opposite said rod portion, wherein said plurality of walls and said cap portion cooperate to at least partially form a pressurizable chamber;
  wherein said tether release/vent-modifying mechanism further includes an actuator operable to selectively emit gas into said pressurizable chamber for moving said movable member from a first position to a second position, said actuator further defining said pressurizable chamber;
  wherein said tether elements are restrained by said rod portion when said movable member is in the first position, thereby restricting inflation of said air bag by said inflator to a first profile, wherein said tether elements are released from said rod portion when said movable member moves to said second position, thereby permitting inflation of said air bag by said inflator to a second profile;
  wherein said first broad portion covers said vent when said movable member is in one of said first position and said second position, and wherein said first broad portion uncovers said vent when said movable member is in the other of said first position and said second position.

15. The vehicle of claim 14, wherein said first broad portion includes an inflation gas reaction surface and a vent-covering portion, wherein said inflation gas reaction surface pushes against said gas released from said inflator, and wherein said cap portion pushes said vent-covering portion and pulls said rod portion when said movable member moves from said first position to said second position.

16. The vehicle of claim 14, further comprising:
  an air bag retainer mountable to said housing for retaining said air bag to said housing upon inflation of said air bag, wherein said tether release/vent-modifying mechanism is mountable to said air bag retainer and is thereby operatively connectable to said housing via said air bag retainer when said air bag retainer is mounted to said housing.

17. The vehicle of claim 14, wherein said tether release/vent-modifying mechanism further includes a floor, wherein said floor is matable with said plurality of walls, wherein said floor is formed with an electrical connector opening, wherein said electrical connector opening abuts said actuator when said floor and said plurality of walls are mated, wherein said electrical connector opening is configured to receive an electrical connector connectable to said actuator, wherein said floor is further formed with a channel leading to said electrical connector opening, wherein said channel is adapted to receive wiring, wherein said wiring may be routed to said electrical connector along said channel;
  wherein said floor further includes an integral retention pin wherein said plurality of walls is formed with a pin opening sized to receive said retention pin, wherein when said floor and said plurality of walls are mated, said integral retention pin extends from said floor through said pin opening towards said movable member to abut said movable member and thereby retain said movable member in said first position prior to emission of gas by said actuator, and wherein said retention pin is sheared by said movable member when said movable member moves to said second position.

18. A tether release/vent-modifying mechanism for an air bag system, the tether release/vent-modifying mechanism comprising:
  a plurality of walls;
  a movable member having a cap portion and a generally elongated rod portion extending longitudinally from an underside of said cap portion, wherein a first broad portion extends from said cap portion opposite said rod portion, wherein said plurality of walls and said cap portion cooperate to at least partially form a pressurizable chamber;
  an actuator operable to selectively emit gas into said pressurizable chamber for moving said movable member from a first position to a second position, said actuator further forming said pressurizable chamber;
  wherein said rod portion is operable to restrain tether elements attached to an inflatable air bag when said movable member is in said first position and to release said tether elements when said movable member moves to said second position, said air bag being inflatable to a first profile when said tether elements are so restrained and to a second profile when said tether elements are so released; and wherein said first broad portion is operable for covering or uncovering an adjacent vent formed in an air bag housing when said movable member moves from said first position to said second position.

19. A method of assembling an air bag system, wherein the air bag system includes an inflatable air bag having releasably restrainable tether elements attached thereto, a tether release/vent-modifying mechanism for releasably restraining said tether elements, said air bag being inflatable by an inflator to a first profile when said tether elements are restrained and to a second profile when said tether elements are released, and an air bag retainer for retaining said air bag to a module housing upon inflation of said air bag, the method comprising:

securing said tether release/vent-modifying mechanism directly to said air bag retainer;

connecting said air bag to said air bag retainer;

restraining said tether elements at said movable member;

after said securing and said connecting, attaching said air bag retainer to said module housing such that said air bag is retained by said housing upon inflation of said air bag; and attaching said inflator to said module housing.

20. The method of claim 19, further comprising:

mounting said module housing to a vehicle.

* * * * *